(12) United States Patent
Oogami

(10) Patent No.: US 7,270,912 B2
(45) Date of Patent: Sep. 18, 2007

(54) MODULE BATTERY

(75) Inventor: Etsuo Oogami, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 718 days.

(21) Appl. No.: 10/608,134

(22) Filed: Jun. 30, 2003

(65) Prior Publication Data
US 2004/0050414 A1 Mar. 18, 2004

(30) Foreign Application Priority Data
Jul. 30, 2002 (JP) .............................. 2002-221999

(51) Int. Cl.
*H01M 2/24* (2006.01)
(52) U.S. Cl. ............... 429/159; 429/160; 429/162; 429/211
(58) Field of Classification Search ............... 429/156, 429/158, 159, 160, 161, 162, 211
See application file for complete search history.

(56) References Cited

U.S. PATENT DOCUMENTS 3,920,477 A * 11/1975 Alaburda ................ 429/162
4,409,304 A * 10/1983 Gerard et al. ............ 429/158
4,554,227 A * 11/1985 Takagaki et al. ........ 429/211 X
5,326,652 A * 7/1994 Lake ..................... 429/162 X
5,503,948 A * 4/1996 MacKay et al. ........ 429/160 X
6,365,297 B1 * 4/2002 Wolczak et al. ............ 429/159

FOREIGN PATENT DOCUMENTS

| JP | 9-050821 A | 2/1997 |
| JP | 2000-58022 A | 2/2000 |
| JP | 2002-141055 A | 5/2002 |
| JP | 2003-338275 A | 11/2003 |

OTHER PUBLICATIONS

U.S. Appl. No. 10/608,132, filed Jun. 30, 2003, Higashino.
U.S. Appl. No. 10/603,782, filed Jun. 26, 2003, Oogami.
U.S. Appl. No. 10/608,133, filed Jun. 30, 2003, Oogami.

* cited by examiner

*Primary Examiner*—Stephen J. Kalafut
(74) *Attorney, Agent, or Firm*—Foley & Lardner LLP

(57) ABSTRACT

A module battery comprises a cell including an electrode tab and a cell body having a power generating element hermetically sealed in a package film. The module battery has a constitution in which a plurality of the cells are stacked on one another, and the electrode tabs of the cells adjacent to each other in a stacking direction are interconnected. Further, a bent portion of an approximate L-shape toward the stacking direction of the cells is formed in each of the electrode tabs of the cells, and the bent portions of the cells adjacent to each other in the stacking direction are at least partially overlapped with each other so as to be interconnected.

6 Claims, 14 Drawing Sheets

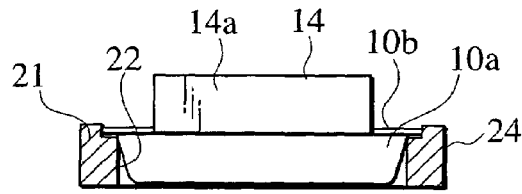
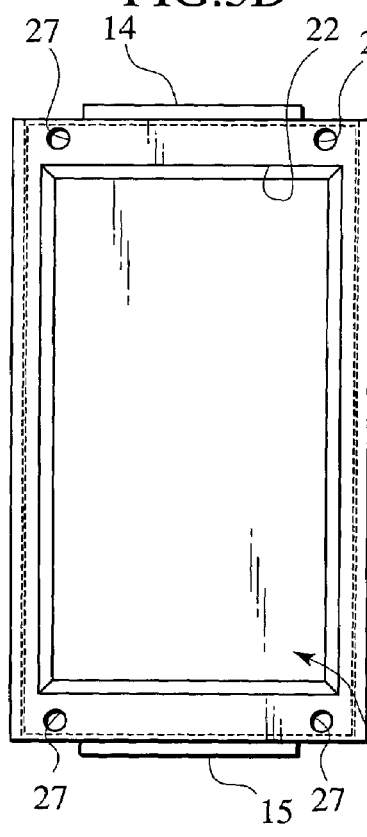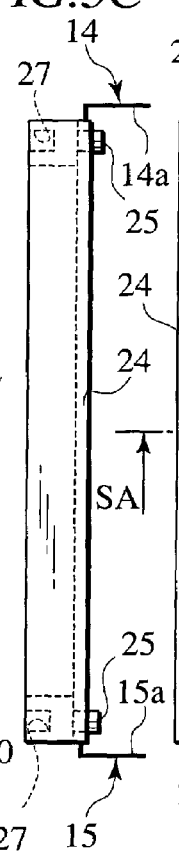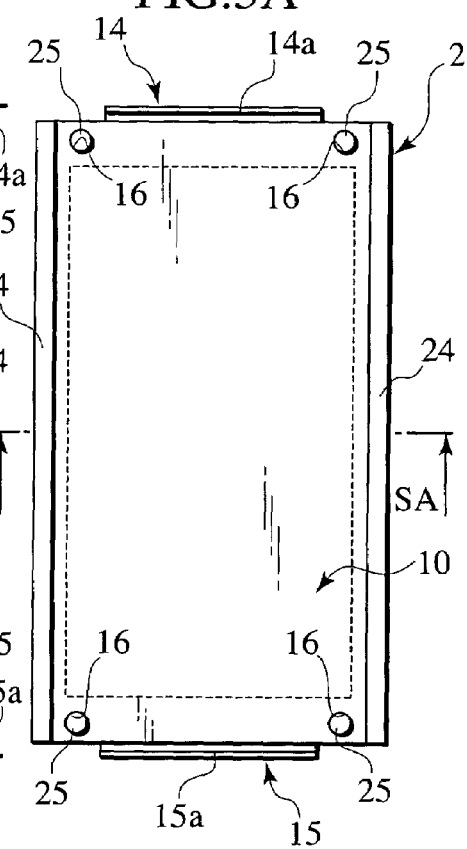
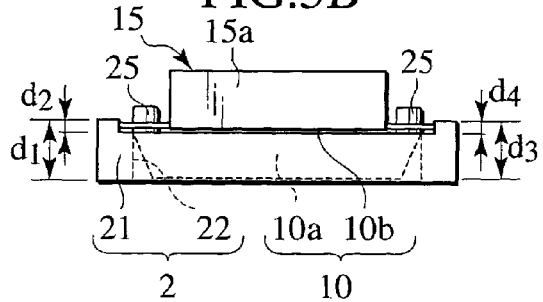

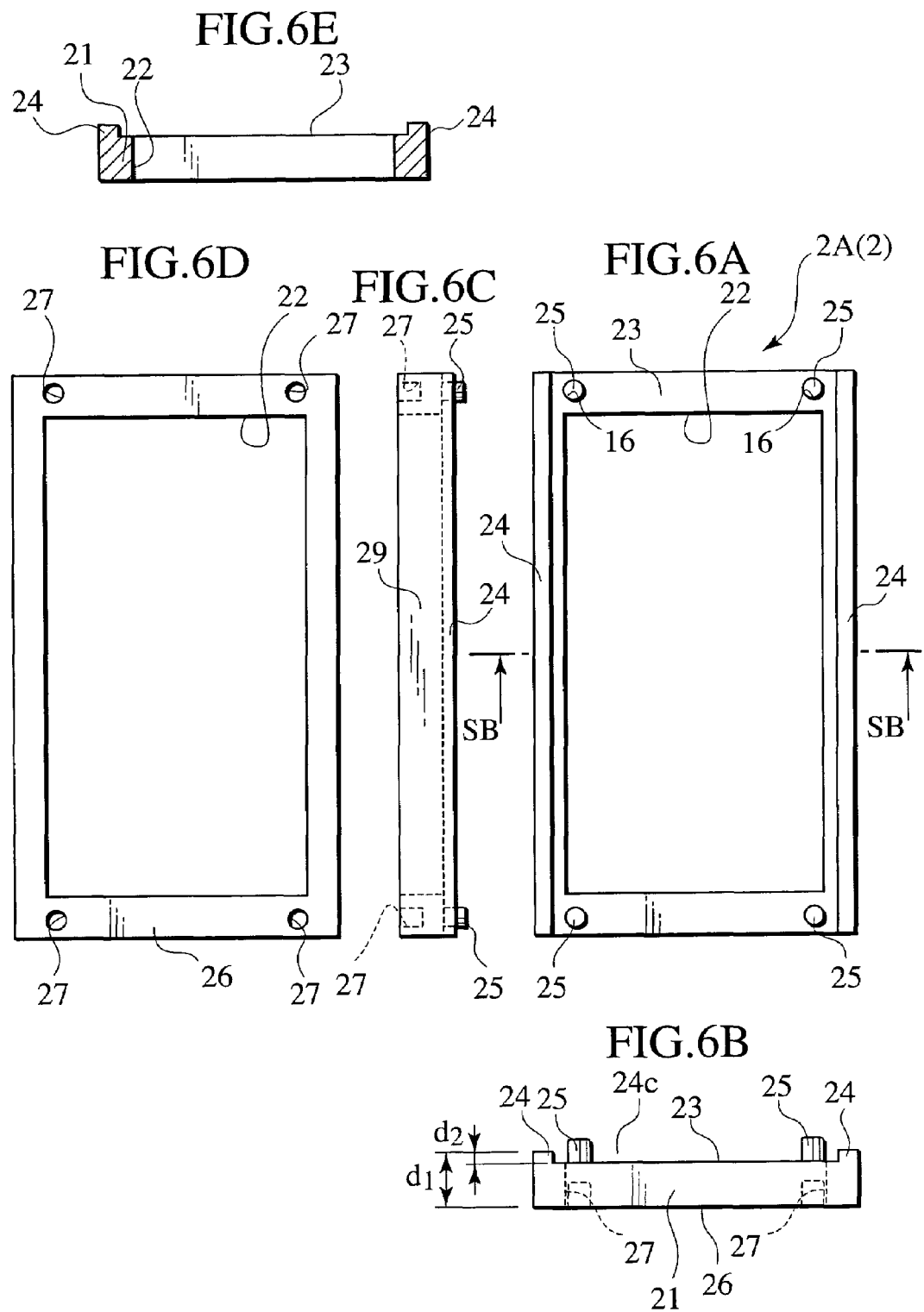

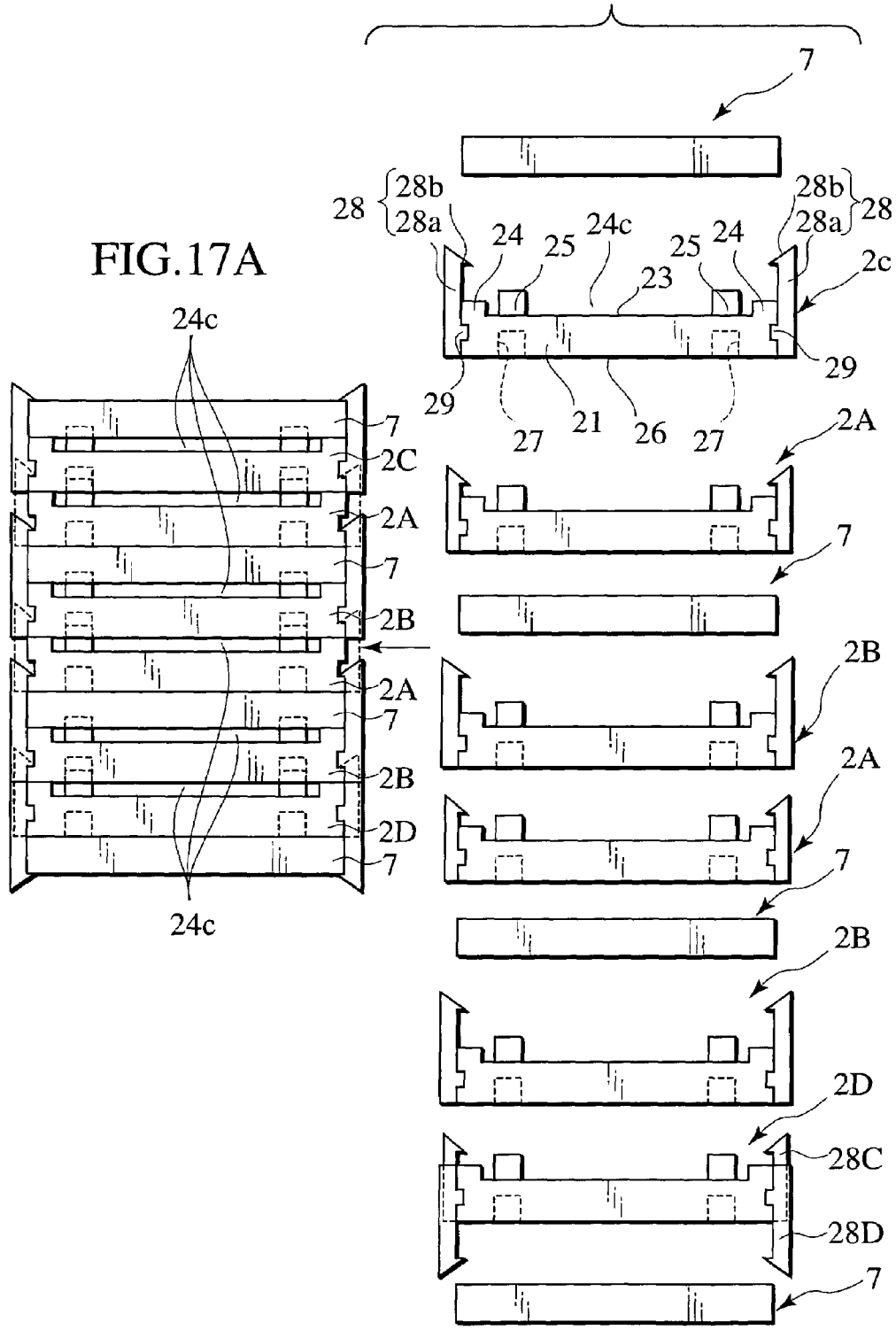

MODULE BATTERY

BACKGROUND OF THE INVENTION

1. Field of the Invention

The present invention relates to a module battery including a plurality of cells in which power generating elements are covered with package films to be hermetically sealed.

2. Description of the Related Art

Japanese Patent Application Laid-Open No. H9-50821 (published in 1997) discloses a module battery composed by stacking at multiple stages a plurality of cells in which power generating elements are hermetically sealed with package films, and by interconnecting the electrode tabs of the cells adjacent to one another in the stacking direction.

SUMMARY OF THE INVENTION

However, this type of module battery is constituted such that the electrode tabs which lead out from the package films of the cells are interconnected in a direction perpendicular to the stacking direction. Therefore, projection amounts of the jointed portions of the electrode tabs are undesirably increased.

The present invention relates to an improvement of the related art as described above. It is an object of the present invention to provide a module battery capable of being miniaturized.

According to one aspect of the present invention, there is provided a module battery, comprising: a cell including an electrode tab and a cell body having a power generating element hermetically sealed in a package film, wherein the module battery has a constitution in which a plurality of the cells are stacked on one another, and the electrode tabs of the cells adjacent to each other in a stacking direction are interconnected, a bent portion of an approximate L-shape toward the stacking direction of the cells is formed in each of the electrode tabs of the cells, and the bent portions of the cells adjacent to each other in the stacking direction are at least partially overlapped with each other so as to be interconnected.

BRIEF DESCRIPTION OF THE DRAWINGS

The invention will now be described with reference to the accompanying drawings wherein;

FIG. 5A is a top view illustrating a cell holder of the module battery of the embodiment according to the present invention under a condition in which a cell is mounted;

FIG. 5B is a side view illustrating the cell holder in which the cell is mounted;

FIG. 5C is a side view illustrating the cell holder in which the cell is mounted;

FIG. 5D is a rear view illustrating the cell holder in which the cell is mounted;

FIG. 5E is a cross sectional view taken on line SA-SA of FIG. 5A illustrating the cell holder in which the cell is mounted;

FIG. 6A is a top view illustrating the cell holder of the module battery of the embodiment according to the present invention;

FIG. 6B is a side view illustrating the cell holder;

FIG. 6C is a side view illustrating the cell holder;

FIG. 6D is a rear view illustrating the cell holder;

FIG. 6E is a cross sectional view taken on line SB-SB of FIG. 6A illustrating the cell holder;

FIGS. 17A and 17B are views illustrating a modified form of a stack body of the module battery according to the present invention.

DETAILED DESCRIPTION OF THE PREFERRED EMBODIMENT

Figure 1:
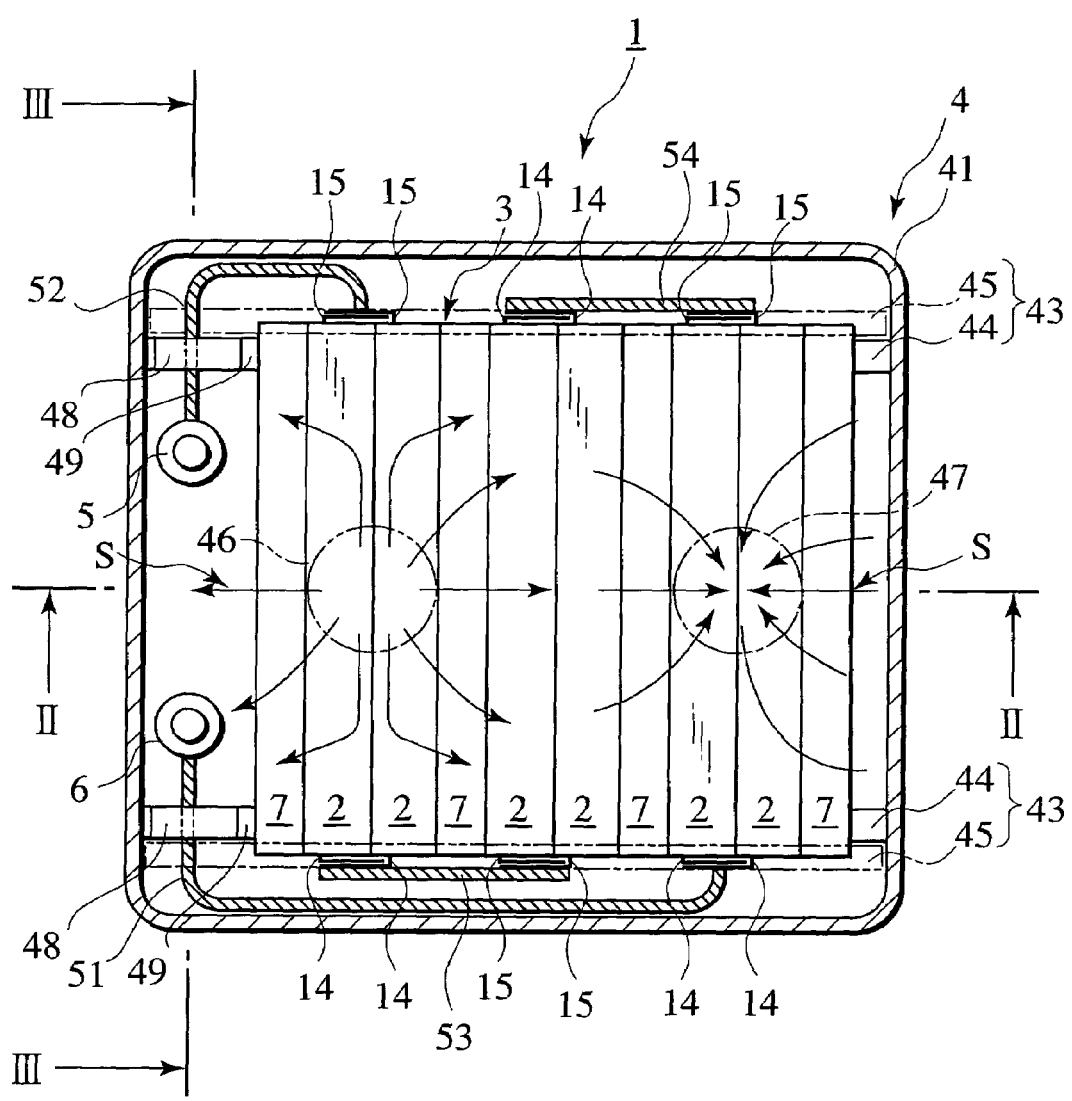
FIG. 1 is a cross sectional view of a module battery of an embodiment according to the present invention.

Hereinafter, description will be made of embodiments of the present invention with reference to the drawings.

FIGS. 1 to 12 illustrate an embodiment of the present invention. As illustrated in FIGS. 1 to 4, a module battery 1 of this embodiment has a basic structure including a stacked body 3, which is composed by stacking at multiple stages a plurality of cell holders 2 (refer to FIGS. 5A to 5E) onto each of which a cell 10 is mounted and held, and a module case 4 (41 and 42) which houses the stacked body 3 therein. The module battery 1 is constituted so that the cells 10 constituting a group in the stacked body 3 are connected in series and/or in parallel to the input and output terminals 5 and 6 through the wires 51 to 54, and electricity is charged/discharged through the input and output terminals 5 and 6.

(Stacked Body)

As illustrated in FIGS. 1 to 4, the stacked body 3 is basically constructed by stacking at the multiple stages the plurality of cell holders 2 (refer to FIGS. 5A to 5E) onto which the cells 10 are mounted and held. In this embodiment, in order to enhance heat radiation, plate-shaped heatsinks 7 are stacked on the uppermost and lowermost stages and interposed between predetermined cell holders 2. Hereinafter, the "cell" and the "cell holder", which constitute the stacked body 3, will be individually described in detail.

(Cell)

Figure 7A:
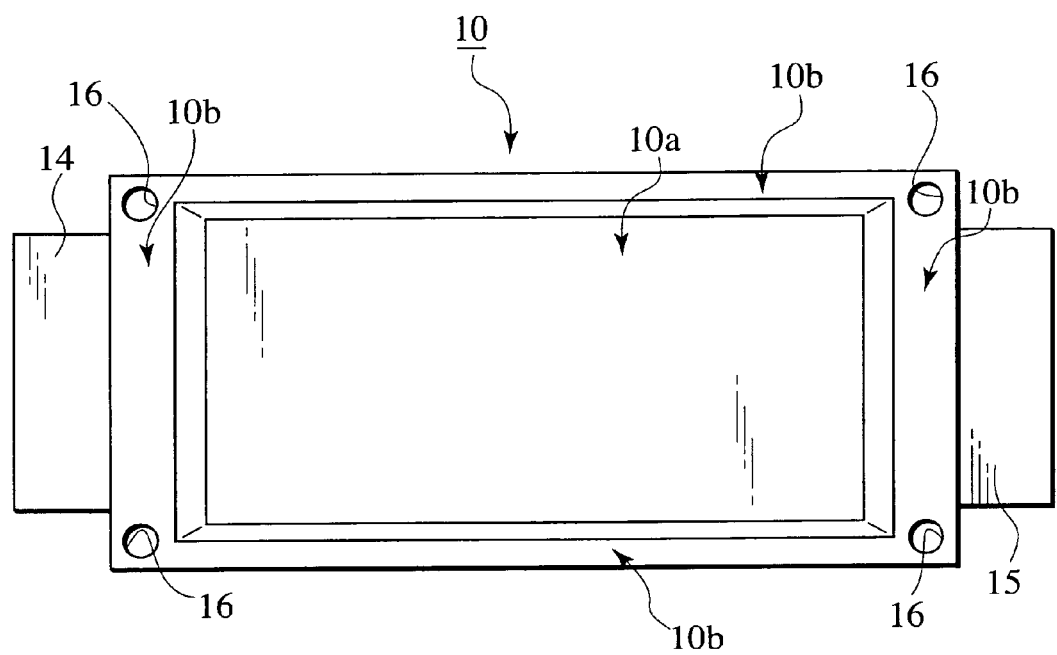
FIG. 7A is a top view illustrating a cell of the module battery of the embodiment according to the present invention.
Figure 7B:
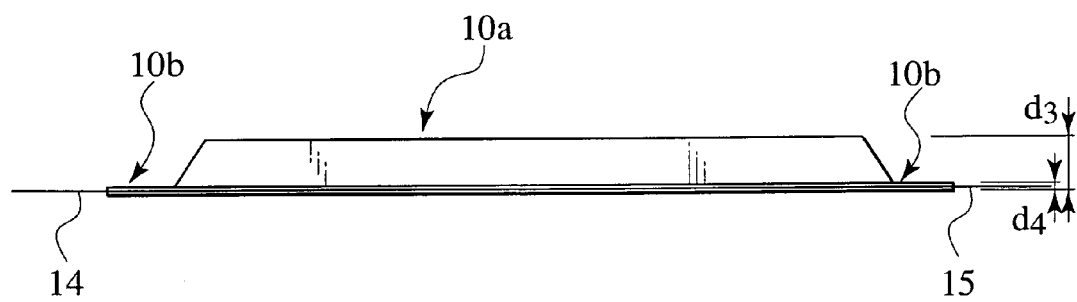
FIG. 7B is a side view illustrating the cell of the module battery.
Figure 8:
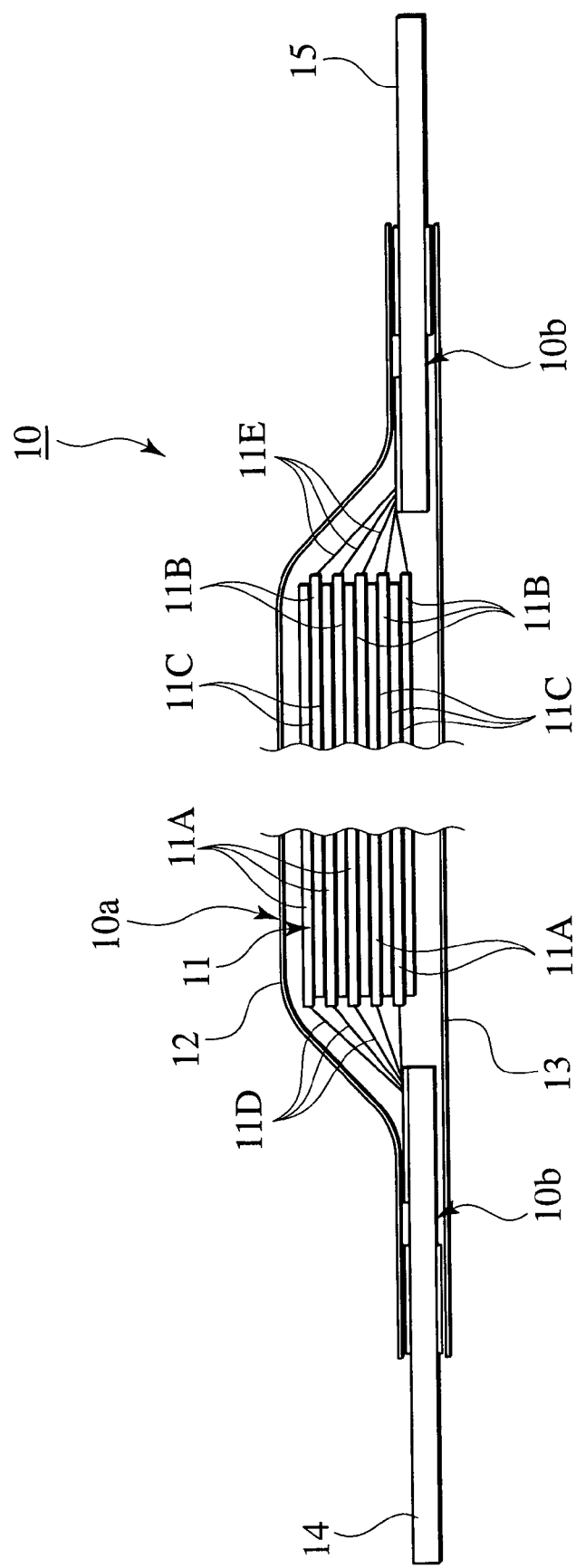
FIG. 8 is a schematic view illustrating an internal structure of the cell of the module battery.

As illustrated in FIGS. 7A, 7B and 8, the cell 10 is one in which a flat-shaped stacked electrode 11 as a power generating element is disposed on center portions of the laminate films 12 and 13 as a pair of package films, both surfaces of the stacked electrode 11 are covered with the laminate films 12 and 13 in a sandwiched manner, and peripheral portions of the laminate films 12 and 13 are joined together by thermowelding, thus hermetically sealing an electrolyte together with the stacked electrode 11 between the laminate films 12 and 13.

In such a way, with regard to the exterior shape of the cell 10, a region on a center portion of the cell, which houses the stacked electrode 11 therein, forms a thick portion 10a, and a jointed portion on a peripheral portion of the cell forms a thin portion 10b (jointed portion 10b).

The stacked electrode 11 is one in which a plurality of positive and negative electrode plates 11A and 11B are sequentially stacked while interposing the separators 11C therebetween. Each of the positive electrode plates 11A is connected to a positive electrode tab 14 through a positive electrode lead 11D, and each of the negative electrode plates 11B is connected to a negative electrode tab 15 through a negative electrode lead 11E. These positive and negative electrode tabs 14 and 15 are led outward from the jointed portions 10b of the laminate films 12 and 13. Note that the stacked electrode 11 and the laminate films 12 and 13 constitute a cell body.

The positive and negative electrode tabs 14 and 15 are formed of metallic foils such as aluminum (Al), copper (Cu), nickel (Ni) and iron (Fe), and in this embodiment, the positive electrode tab 14 is formed of Al and the negative electrode tab 15 is formed of Ni. In addition, each of the laminate films 12 and 13 is composed of a nylon layer $\alpha$ as a resin layer, an adhesive layer $\beta$, an aluminum foil layer $\gamma$ as a metallic layer, and a polyethylene or polypropylene layer $\delta$ as a resin layer in order from the outside to the inside.

Figure 9:
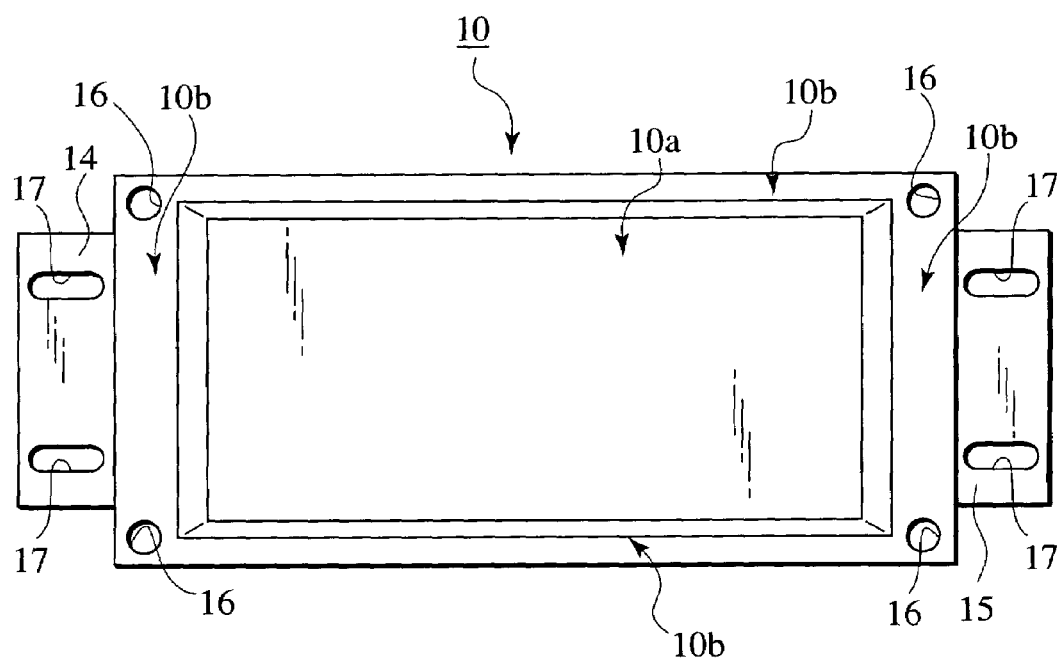
FIG. 9 is a view illustrating another example of a cell of the module battery according to the present invention.

Note that regarding the cell 10 of this embodiment, there is one type of the cell 10 which is provided with slits 17 in the electrode tabs 14 and 15 as illustrated in FIG. 9, while there is another type of the cell 10 which has no slits 17 as illustrated in FIG. 7. In all types of the cell 10, folds are made on the base end portion of the electrode tabs 14 and 15, and the tip sides of the electrode tabs 14 and 15 from the folds are bent in advance to the stacking direction of the cells 10, thus each of the electrode tabs 14 and 15 is formed into an approximate L-shape (refer to FIG. 5C).

(Raw Materials of Cell)

The module battery 1 of the present embodiment has an on-vehicle application and includes a battery employing a lithium ion secondary battery with a high energy density and high power output. Hereinafter, the materials of the lithium ion battery are additionally explained.

As a positive electrode active material forming the positive electrode plate 11A, a compound is contained that includes lithium nickel composite oxides, in particular, compounds expressed by a general formula $LiNi_{1-x}M_xO_2$. Here, x lies in a range of $0.01 \leq x \leq 0.5$, and M represents at least one element selected from iron (Fe), manganese (Mn), copper (Cu), aluminum (Al), tin (Sn), boron (B), gallium (Ga), chromium (Cr), vanadium (V), titanium (Ti), magnesium (Mg), calcium (Ca) and strontium (Sr).

Further, the positive electrode may contain other positive electrode active material than the lithium nickel composite oxides. This material may include lithium manganese composite oxides that form compounds expressed by a general formula $Li_yMn_{2-z}M'_zO_4$. Here, y lies in a range of $0.9 \leq y \leq 1.2$ while z lies in a range of $0.01 \leq z \leq 0.5$, and M' represents at least one element selected from Fe, Co, Ni, Cu, Zn, Al, Sn, B, Ga, Cr, V, Ti, Mg, Ca and Sr. Alternately, this material may contain compounds expressed by a general formula $LiCo_{1-x}M''_xO_2$. Here, a range of x lies in $0.01 \leq x \leq 0.5$, and M'' represents at least one element selected from Fe, Ni, Mn, Cu, Zn, Al, Sn, B, Ga, Cr, V, Ti, Mg, Ca and Sr.

Although there are no particular limitations in the manufacturing methods of the lithium nickel composite oxides, the lithium manganese composite oxides and the lithium cobalt composite oxides, these compounds may be obtained by mixing carbonates such as lithium, nickel, manganese and cobalt at ratios depending on constituents thereof and baking these carbonates in a temperature ranging from 600° C. to 1000° C. Also, the starting materials may not be limited to the carbonates and can also be similarly synthesized from hydroxides, oxides, nitrates and organic acid salts.

Also, the positive electrode material such as the lithium nickel composite oxides and the lithium manganese composite oxides should preferably have an average particle size of 30 μm or below.

Further, the negative electrode plate 11B is formed of the negative electrode active material with a specific surface area in a range from 0.05 $m^2/g$ to 2 $m^2/g$. As a result of the negative electrode material with a specific surface area in the above range, it is possible to adequately restrict an excessive amount of a solid electrolyte interface layer (SEI layer) from being formed on the negative electrode surface.

With the negative electrode active material having a specific surface area of less than 0.05 $m^2/g$, since an area available for lithium ions to transfer is extremely small, the lithium ions doped into the negative electrode active material during the charging cycle become too hard to be sufficiently doped out from the negative electrode active material during the discharging cycle, resulting in deterioration in the charging and discharging efficiency. Conversely, with the negative electrode active material having a specific surface area of greater than 2 $m^2/g$, it is difficult to control an excessive amount of the SEI layer from being formed on the negative electrode surface.

The negative electrode active material may include any material that allows the lithium ions to be doped into or out of the material at a voltage versus lithium of less than 2.0 volts. More particularly, carbonaceous materials may be used which involve a non-graphitizable carbon material, artificial graphite, natural graphite, pyrolytic graphite, cokes including pitch coke, needle coke and petroleum coke, graphite, glassy carbon, a sintered material of polymers formed by baking and carbonizing phenol resin or furan resin at an appropriate temperature, carbon fiber, activated carbon and carbon black.

Further, a metal, that is able to form an alloy with lithium, and an alloy thereof can also be used and, in particular, these materials include oxide products or nitride products, that allow the lithium ions to be doped into or out of the material at a relatively low voltage potential, such as iron oxide, ruthenium oxide, molybdenum oxide, tungsten oxide, tin oxide and main group elements of group 13. In addition thereto, these materials include elements such as silicon (Si) and tin (Sn), or alloys of Si and Sn represented by a formula $M_xSi$ and $M_xSn$ (wherein M represents more than one metallic element except for Si or Sn). Among these, it is particularly preferable for Si or the Si alloys to be used.

Further, the electrolyte may include a liquid state, a so-called electrolysis solution composed of electrolyte salts dissolved in and adjusted in a non-aqueous solvent, polymer gel electrolyte composed of the electrolyte salt dissolved in the non-aqueous solvent which is retained in a polymer matrix, and polymer electrolyte composed of the electrolyte salt dissolved in the polymer.

When using the polymer gel electrolyte as the non-aqueous electrolyte, the polymer to be used includes poly (vinylidene fluoride) and polyacrylonitrile. Also, when using the polymer electrolyte, a polymer of polyethylene oxide (PEO) may be used.

The non-aqueous solvent may include any kind of solvent if it remains in a non-aqueous solvent heretofore used in a secondary battery using such kinds of non-aqueous electrolyte. As the non-aqueous solvent, propylene carbonate, ethylene carbonate, 1,2-dimethoxyethane, diethyl carbonate, dimethyl carbonate, γ-butyrolactone, tetrahydrofuran, 1,3-dioxolane, 4-methyl-1,3-dioxolane, diethylether, sulfolane, methyl sulfolane, acetonitrile and propionitrile can be used. Also, these non-aqueous solvents may be used as a single kind or in a mixture of more than two kinds.

Particularly, the non-aqueous solvent should preferably contain an unsaturated carbonate. More particularly, it is more preferable for the non-aqueous solvent to contain vinylene carbonate. The presence of the unsaturated carbonate contained as the non-aqueous solvent enables an effect, derived in the negative electrode active material from the property (a function of a protective layer) of the SEI layer, to be obtained and it is conceivable that an excessive discharging-resistant characteristic is further improved.

Further, the unsaturated carbonate should be preferably contained in the electrolyte in a range from 0.05 wt % to 5 wt % and, more preferably, in a range from 0.5 wt % to 3 wt %. With the amount of content of the unsaturated carbonate being weighed in the above range, a non-aqueous secondary battery is provided which has a high initial discharging capacity with a high energy density.

The electrolyte salt may not be limited to a particular composition provided that it forms a lithium salt presenting an ion conductivity and may include $LiClO_4$, $LiAsF_6$, $LiPF_6$, $LiBF_4$, $LiB(C_6H_5)_4$, LiCl, LiBr, $CH_3SO_3Li$ and $CF_3SO_3Li$. The electrolyte salt may be used as a single kind or may be possibly used in a mixture of more than two kinds.

The use of such a lithium ion secondary battery provides the module battery 1, of the present embodiment, with a structure suited for use in an on-vehicle application.

(Cell Holder)

The cell holder 2 is made of a heat-resistant insulating material. As illustrated in FIGS. 5A to 6E, the cell holder 2 is formed into a frame shape by including a frame section 21 on which the thin portion 10b of the cell 10 is mounted, and an opening portion 22 which houses the thick portion 10a of the cell 10 therein. A plurality of the cell holders 2 can be stacked at the multiple stages while the cells 10 are mounted and held thereon (refer to FIG. 4).

In the frame section 21 of the cell holder 2, a vertical wall 24 is provided on an outer peripheral side of the mounting surface 23, on which the thin portion 10b of the cell 10 is mounted, so as to be projected toward the stacking direction of the cell holders 2. The electrode tabs 14 and 15 of the cell 10 are exposed from notched portions 24c provided on the both ends of the vertical wall 24 in a longitudinal direction of the cell holder 2. Thus, when a plurality of the cell holders 2 onto which the cells 10 are mounted are stacked at the multiple stages, each of the cells 10 is held between the cell holders 2 and 2 adjacent to each other in the stacking direction, and the electrode tabs 14 and 15 of the cell 10 are exposed from between the adjacent cell holders 2 and 2. Therefore, the work of interconnecting the electrode tabs 14 and 15 and the work of connecting the electrode tabs 14 and 15 to the wires 51 to 54 can be conducted without concern for the rigidity of the cell 10.

Figure 10:
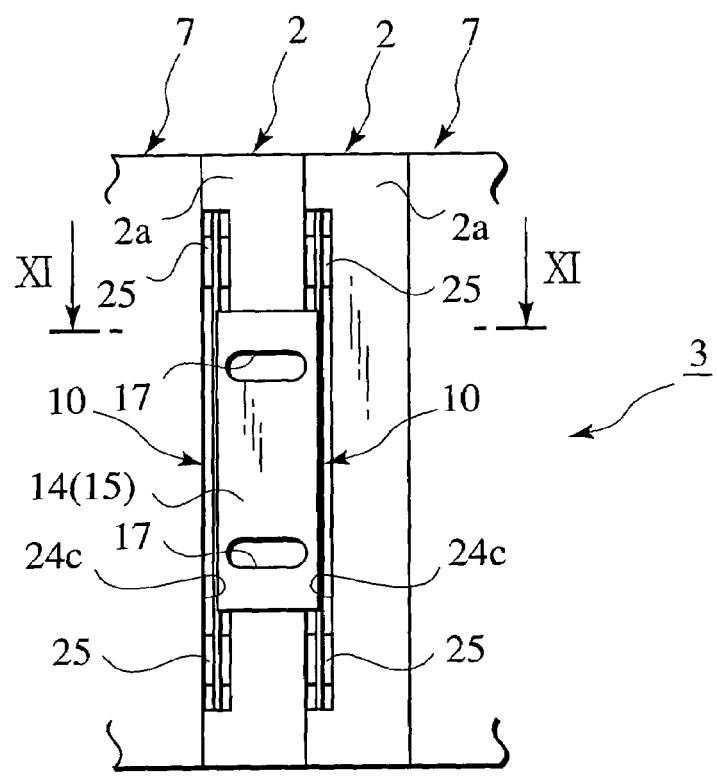
FIG. 10 is a substantially enlarged view illustrating a connecting structure of the cell of the embodiment according to the present invention.
Figure 11:
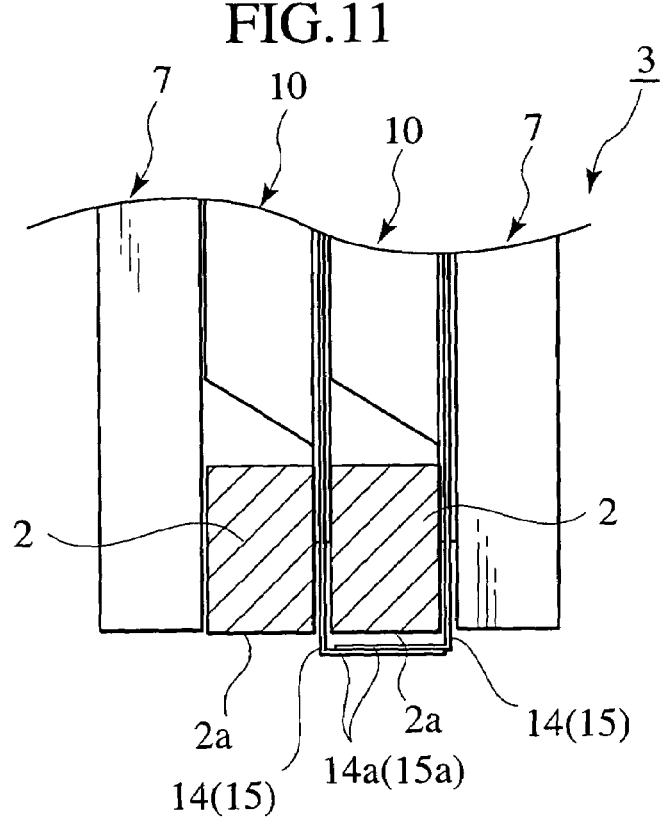
FIG. 11 is a cross sectional view taken on line XI-XI of FIG. 10.

Here, this embodiment is characterized by the interconnection structure of the electrode tabs 14 and 15 of the cells 10 stacked by interposing the cell holders 2 therebetween. As illustrated in FIGS. 10 and 11, bent portions 14a and 15a in the respective electrode tabs 14 and 15 of the cell 10 adjacent to each other in the stacking direction are overlapped with each other so as to be electrically interconnected. Thus, the projection amounts of the electrode tabs 14 and 15 are decreased (the length of the cell 10 in a longitudinal direction is shortened), and extra projections in the stacked body 3 are decreased. As a consequence, the module battery 1 can be miniaturized.

Moreover, on four corners of the mounting surface 23 of the frame section 21, locate pins 25 projected toward the stacking direction of the cell holders 2 are provided, and each cell 10 is positioned in the cell holder 2 by engaging the locate pins 25 with through-bores 16 provided in the jointed portions 10b of the cell 10.

Meanwhile, on a back surface 26 of the cell holder 2, locate holes 27 are formed at positions corresponding to the locate pins 25. Accordingly, when stacking the cell holders 2, the locate pins 25 of the cell holder 2 located at a lower side in the stacking direction are engaged with the locate holes 27 of the holder 2 located at an upper side in the stacking direction, and thus the cell holders 2 can be stacked at the multiple stages without being out of alignment.

Note that a plurality of the cell holders 2 may be constructed so as to be freely coupled to one another by providing couplings to the cell holder 2. For example, as illustrated in FIGS. 17A and 17B, when providing four types of cell holders 2 (2A, 2B, 2C and 2D) different from one another in coupling constitution, a plurality of the cell holders 2 can be securely coupled to one another. The cell holders 2 (2A, 2B, 2C and 2D) will be described below for each type with reference to FIGS. 17A and 17B.

The cell holder 2A is of a type capable of securely coupling the cell holder directly stacked onto an upper side thereof. In couplings 28 of the cell holder 2A, the length of flexible arms 28a is set such that hooks 28b are engaged with an outer peripheral recess 29 in the frame section 21 of the cell holder 2 adjacent to the upper side of the cell holder 2A in the stacking direction.

The cell holder 2B is of a type capable of securely coupling the cell holder 2 onto an upper side thereof in a state where the heatsink 7 is interposed therebetween. In the couplings 28 of the cell holder 2B, the length of the flexible arms 28a is set such that the hooks 28b are engaged with the outer peripheral recess 29 of the cell holder 2 adjacent to the upper side of the cell holder 2B while interposing the heatsink 7 therebetween.

The cell holder 2C is of a type capable of securely coupling the heatsink 7 onto an upper side thereof. In the couplings 28 of the cell holder 2C, the length of the flexible arms 28a is set such that the hooks 28b are engaged with corner portions in a peripheral edge of an upper surface of the heatsink 7 located on the upper side of the cell holder 2C.

The cell holder 2D is of a type capable of securely coupling the cell holder 2 directly stacked onto an upper side thereof and of securely coupling the heatsink 7 onto a lower side thereof. The cell holder 2D includes two types of couplings 28C and 28D. In the couplings 28C, the length of the flexible arms 28a is set such that the hooks 28b are engaged with the outer peripheral recess 29 in the frame section 21 of the cell holder 2 adjacent to the upper side of the cell holder 2D in the stacking direction. In the couplings 28D, the length of the flexible arms 28a is set such that the hooks 28b are engaged with the corner portions in a peripheral edge of a lower surface of the heatsink 7 located on the lower side of the cell holder 2D.

(Module Case)

Figure 2:
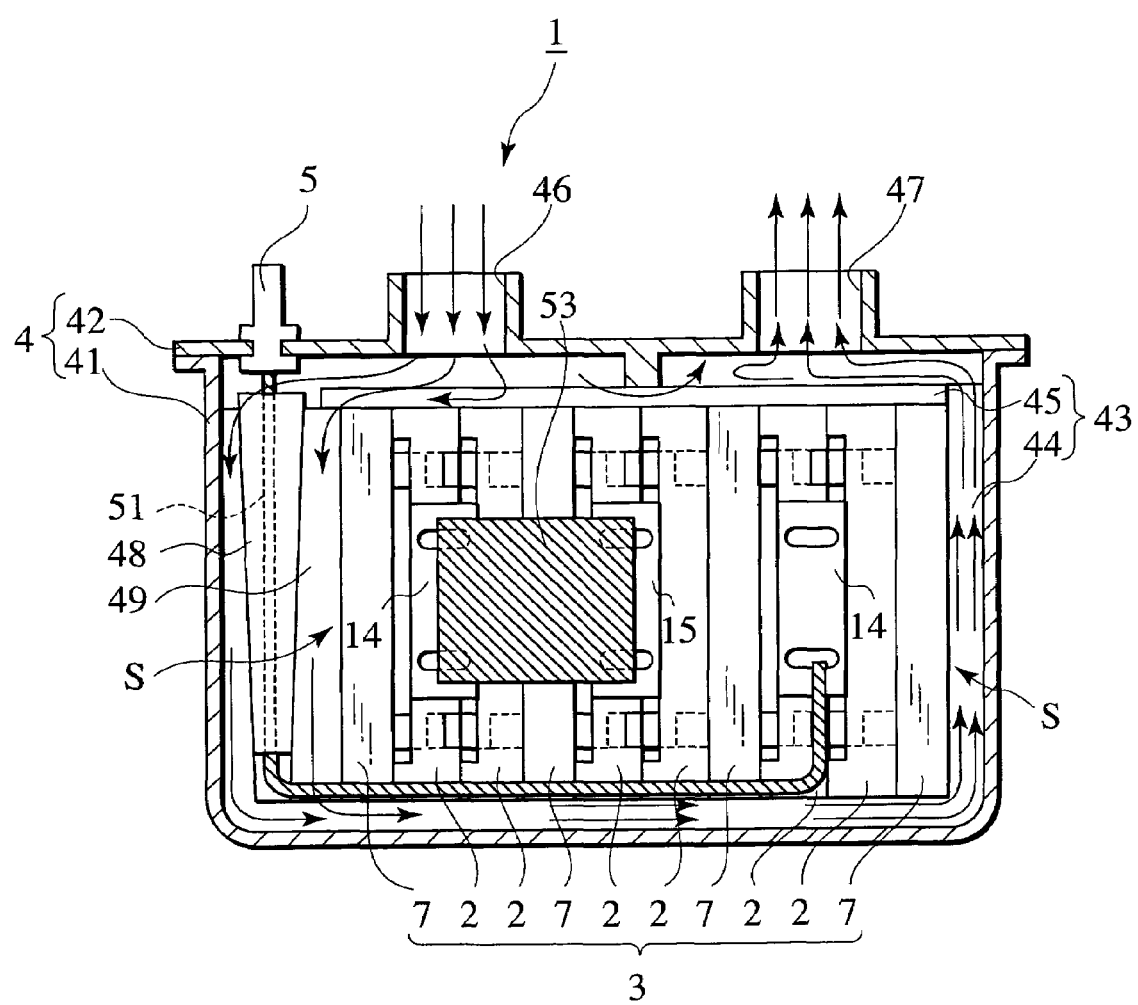
FIG. 2 is a cross sectional view taken on line II-II of FIG. 1.
Figure 3:
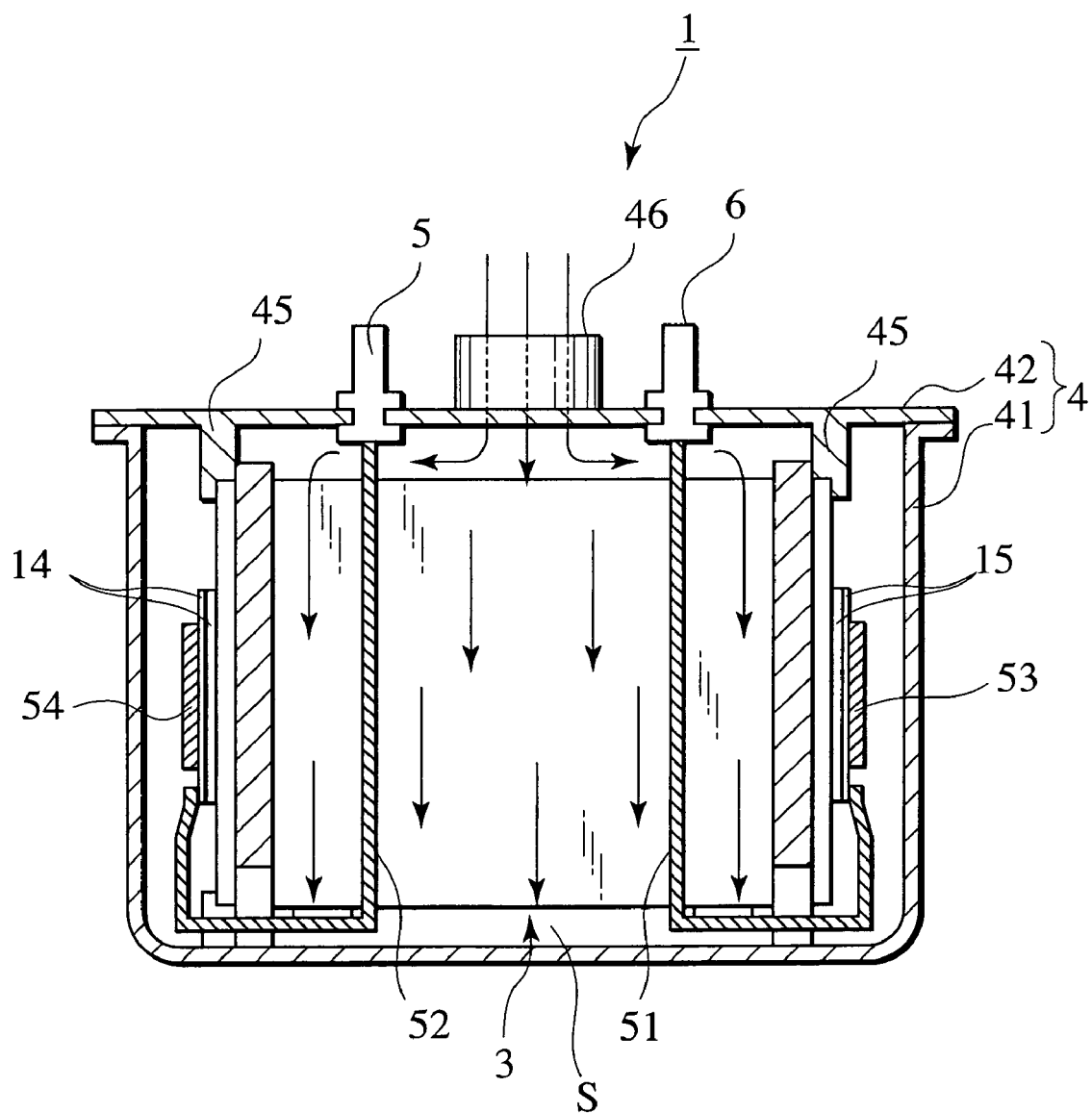
FIG. 3 is a cross sectional view taken on line III-III of FIG. 1.
Figure 4:
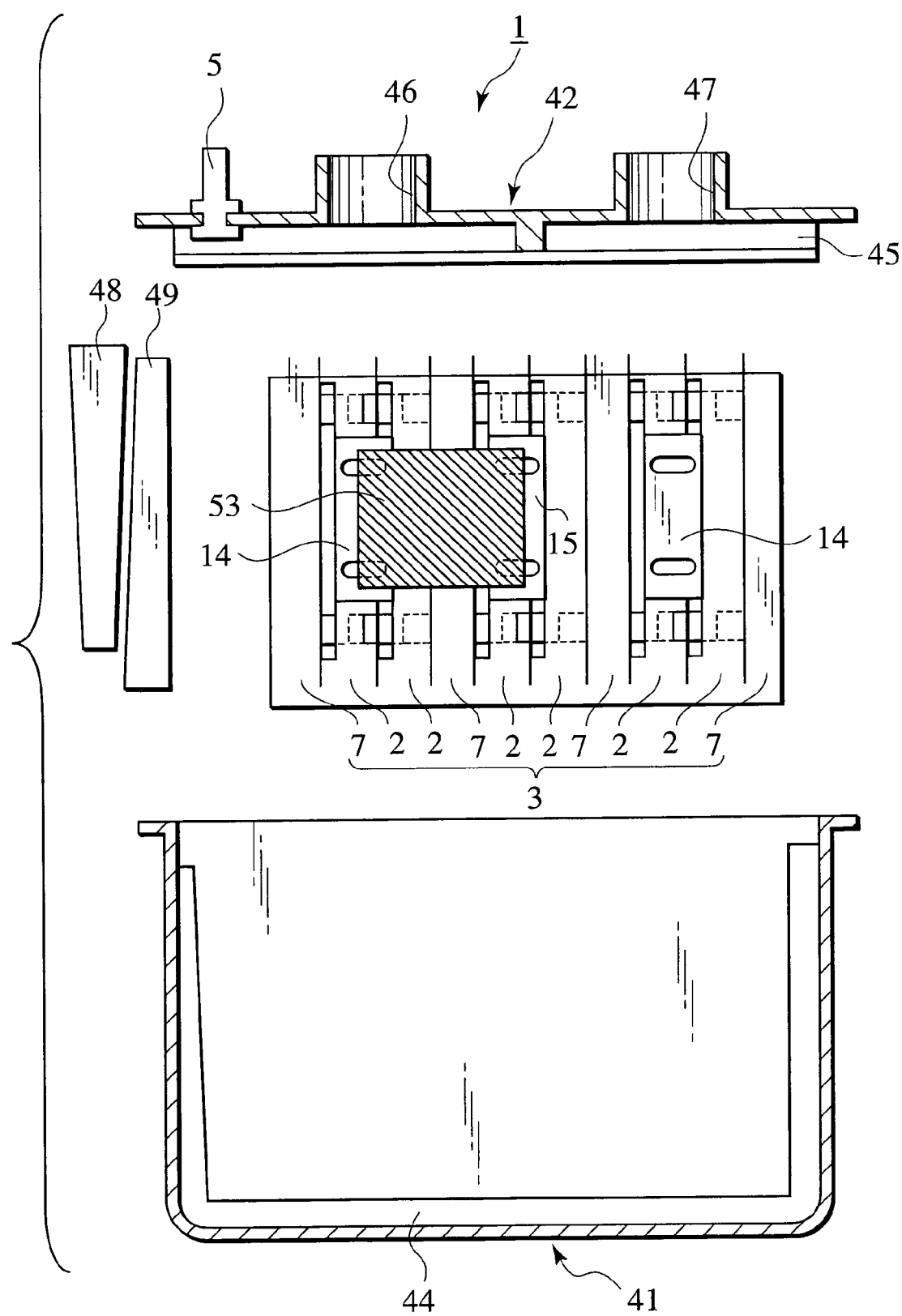
FIG. 4 is an exploded view of the module battery of the embodiment according to the present invention.

As illustrated in FIGS. 1 to 4, the module case 4 is composed of the case body 41 formed into a container shape and the lid member 42 hermetically sealing an upper opening portion of the case body 41. The module case 4 is one which houses the stacked body 3 therein. As illustrated in FIGS. 1, 2 and 4, on an inner surface of the module case 4, a pair of ribs 43 attached along the inner surface of the module case 4 are provided so as to be projected therefrom. Spaces S are formed between the stacked body 3 and the inner surface of the module case 4 by the ribs 43. The outside air is passed through the spaces S via an air inlet 46 and an air outlet 47, thus making it possible to radiate the heat of the group of cells 10 in the stacked body 3. Note that, as illustrated in FIGS. 1, 2 and 4, each of the ribs 43 is composed of a rib 44 provided on the case body 41 and a rib 45 provided on the lid member 42. In addition, in the drawings, reference numerals 48 and 49 denote wedge-shaped spacers for holding the stacked body 3 in the module case 4 so as to allow no looseness.

(Assembly Process)

The module battery 1 is assembled in the following manner.

First, as illustrated in FIGS. 5A to 5E, one cell 10 is mounted and held on one cell holder 2. In this case, the through-bores 16 of the cell 10 are engaged with the locate pins 25 of the cell holder 2 from the outside, and thus the cell 10 is positioned and held on the cell holder 2.

Next, the cell holders 2, onto which the cells 10 are mounted and held, and the heatsinks 7 are stacked in a predetermined order, and thus the stacked body 3 is formed (refer to FIG. 4).

Next, the electrode tabs 14 and 15, which are exposed from the stacked body 3, of the cells 10 are connected in series and/or in parallel to the input and output terminals 5 and 6 fixed onto the lid member 42 through the wires 51 to 54. At this point, the electrode tabs 14 (15) of the cells 10 adjacent to each other are joined together by bending the bent portions 14a (15a) so as to be overlapped with each other. In this case, because the cell 10 is held by the cell holder 2, the work of interconnecting the electrode tabs 14 and 15 and the work of connecting the electrode tabs 14 and 15 to the wires 51 to 54 can be conducted without concern for the fragility of the cell 10.

Next, as illustrated in FIG. 4, the stacked body 3 to which the wires 51 to 54 are connected in the above-described manner is housed in the case body 41, the pairs of wedge-shaped spacers 48 and 49 are engaged between the stacked body 3 and the ribs 43 of the case body 41, and thus the stacked body 3 is accommodated in the case body 41 with no looseness. Finally, the lid member 42 is put and joined onto the upper opening portion of the case body 41, and the desired module battery 1 is formed.

Figure 12:
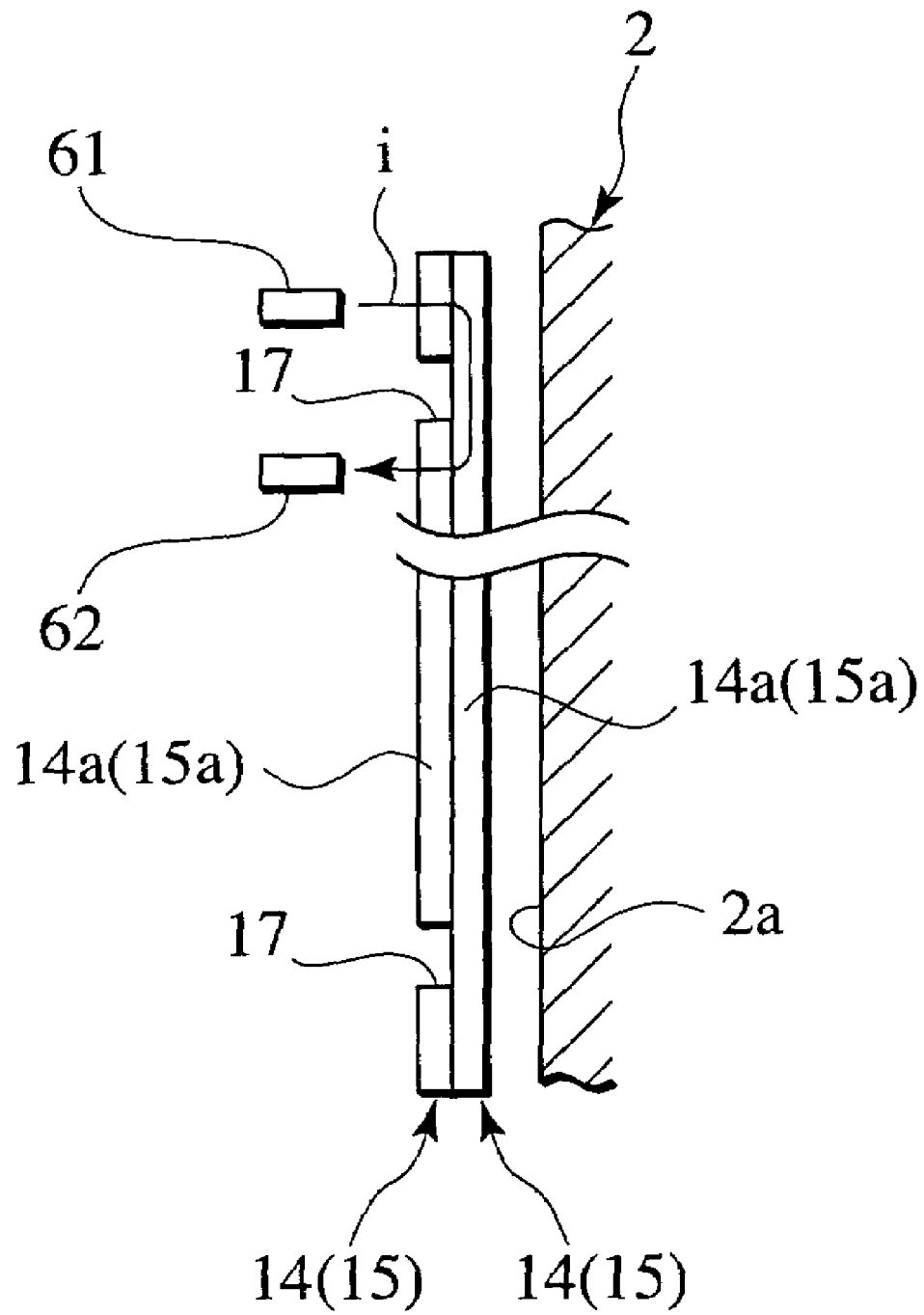
FIG. 12 is an explanatory view illustrating a connection process of the cell of the embodiment according to the present invention.

Here, the interconnection of the electrode tabs 14 and 15 of the cells 10 is conducted by spot welding. More specifically, among the bent portions 14a and 15a stacked as illustrated in FIG. 12, the bent portions except for the bent portion which is placed on the inner side (the cell holder side) are provided with the slits 17. A pair of welding electrodes 61 and 62 are brought into contact with each of the bent portions 14a and 15a while passing around the slits 17 to flow the welding current i therethrough. Thus, the stacked bent portions 14a and 15a are joined together.

In the case where no slits are provided when the interconnection of the overlapped bent portions 14a and 15a is conducted by the spot welding as described above, there is a concern that the interconnection of the electrode tabs 14 and 15 may become imperfect because the welding current i does not flow to the inside bent portion 14a or 15a from the outside bent portion 14a or 15a. However, the slits 17 are provided on the bent portions 14a and 15a of the electrode tabs 14 and 15 in this embodiment, and therefore, the current from the welding electrodes 61 and 62 flows to the bent portions 14a and 15a while striding over the slits 17. Thus, an imperfect interconnection as described above can be avoided.

The module battery 1 thus constituted is provided with the following operation and effect.

The electrode tabs 14 and 15 of the cells 10 are bent in the stacking direction of the cells 10 to be formed into the approximate L-shape, and the bent portions 14a and 15a of the cells 10 adjacent to each other in the stacking direction are overlapped and connected with each other. Accordingly, the projection amounts of the electrode tabs 14 and 15 from the body of the cell 10 are decreased, and the module battery 1 can be miniaturized by this amount.

Because the slits 17 are provided in the bent portions 14a and 15a of the respective electrode tabs 14 and 15 of the cells 10, the overlapped bent portions 14a and 15a can be securely joined to each other by the spot welding. Specifically, when the interconnection of the overlapped bent portions 14a and 15a is conducted by the spot welding, there is a concern that the welding current i may not flow from the outside bent portion 14a or 15a to the inside bent portion 14a or 15a, thus leading to the imperfect interconnection of the electrode tabs 14 and 15. However, because the slits 17 are provided in the bent portions 14a and 15a in this embodiment as described above, the imperfect interconnection described as above can be avoided by conducting the welding in a state where the welding electrodes 61 and 62 are arranged while passing around the slits 17.

Figure 13:
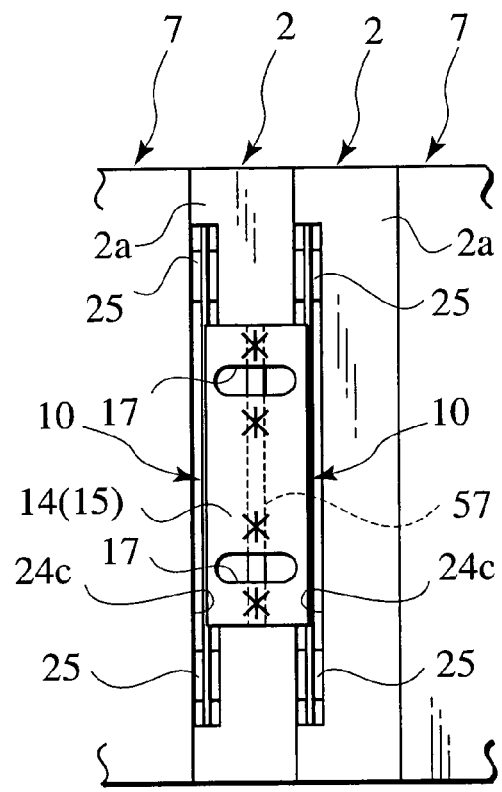
FIG. 13 is a view illustrating a modified form of the connecting structure of the cell of the embodiment according to the present invention.
Figure 14:
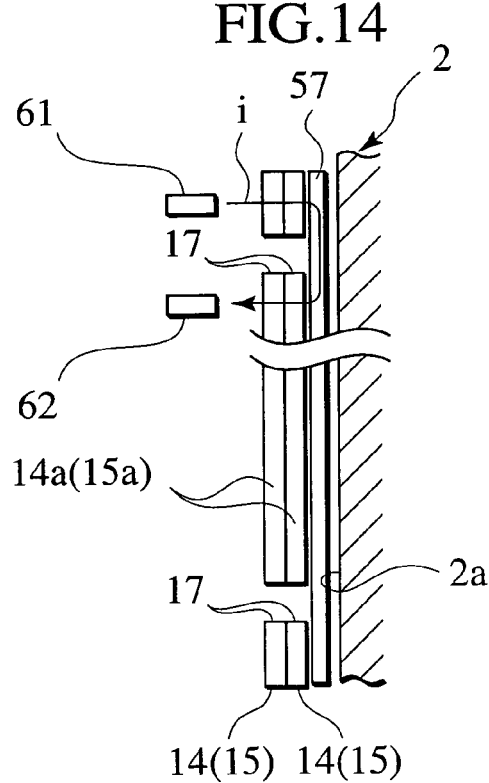
FIG. 14 is an explanatory view illustrating a connection process of the cell shown in FIG. 13.

In addition, in this embodiment, among the stacked bent portions 14a and 15a, no slits 17 are provided in the inside bent portions 14a and 15a. Therefore, unlike a structure, as illustrated in FIGS. 13 and 14, in which the slits 17 are provided in all of the stacked bent portions 14a and 15a, a metal member 57 for bypassing the welding current is disposed on the inside of the stacked bent portions 14a and 15a, and the stacked bent portions 14a and 15a are welded together with the metal member 57, it is not necessary to dispose the metal member 57 for bypassing the welding current on the inside (cell holder side) of the stacked bent portions 14a and 15a. Thus, facilitation of the connection work and a reduction in cost are enabled. Note that the connection structure of the electrode tabs 14 and 15, which is illustrated in FIGS. 13 and 14, is also included in the present invention. In the connection structure of the electrode tabs 14 and 15, which is illustrated in FIGS. 13 and 14, the wires 51 to 54 and unillustrated wires for current detection and the like are substituted for the metal members 57 for bypassing the welding current, thus making it possible to achieve a cost reduction.

The module battery 1 is composed by stacking a plurality of the cell holders 2, onto which the cells 10 are mounted and held, at the multiple stages, and is composed by exposing the electrode tabs 14 and 15 of the cell 10 from between the cell holders 2 and 2 adjacent to each other in the stacking direction. Therefore, the work of interconnecting the electrode tabs 14 and 15 of the cells 10 and the work of connecting the electrode tabs 14 and 15 to the wires 51 to 54 can be conducted without concern for the fragility of the cell 10. Accordingly, the work of assembling the module battery 1 is further facilitated.

The cell holder 2 is made of heat-resistant insulating resin. Therefore, the bent portions 14*a* and 15*a* can be stacked on each other by use of an outer side face 2*a* of the cell holder 2 as a support, and the stacked bent portions 14*a* and 15*a* can be spot-welded together. Accordingly, the work of interconnecting the electrode tabs 14 and 15 is further facilitated.

While the cell holder 2 includes the locate pins 25, the cell 10 includes the through-bores 16 through which the locate pins 25 of the cell holder 2 penetrate. Accordingly, the positioning of the cell 10 is facilitated, and the work of assembling the module battery 1 still further facilitated. In addition, because the cells 10 are held in the respective cell holders 2 with no looseness, ease in handling the module battery 1 is also enhanced.

The locate pins 25 of the cell holders 2 are projected toward the stacking direction of the cell holders 2, and the locate holes 27 which receives the locate pins 25 of the cell holders 2 and performs the positioning are provided in one of the cell holders 2 adjacent to each other in the stacking direction. Therefore, the cell holders 2 can be stacked at the multiple stages without being out of alignment. Thus, ease in handling the module battery 1 is further enhanced.

Figure 15:
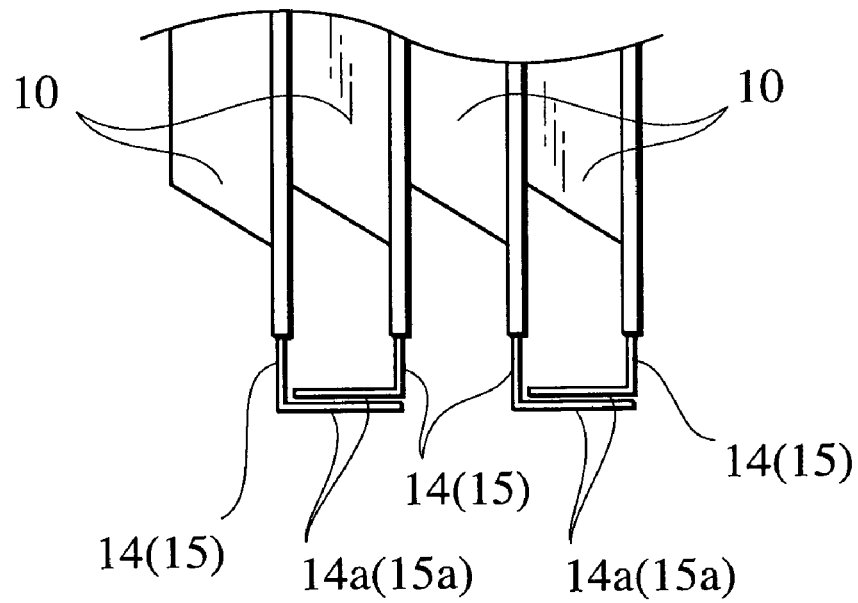
FIG. 15 is a view illustrating a modified form of the connecting structure of the cell of the embodiment according to the present invention.
Figure 16:
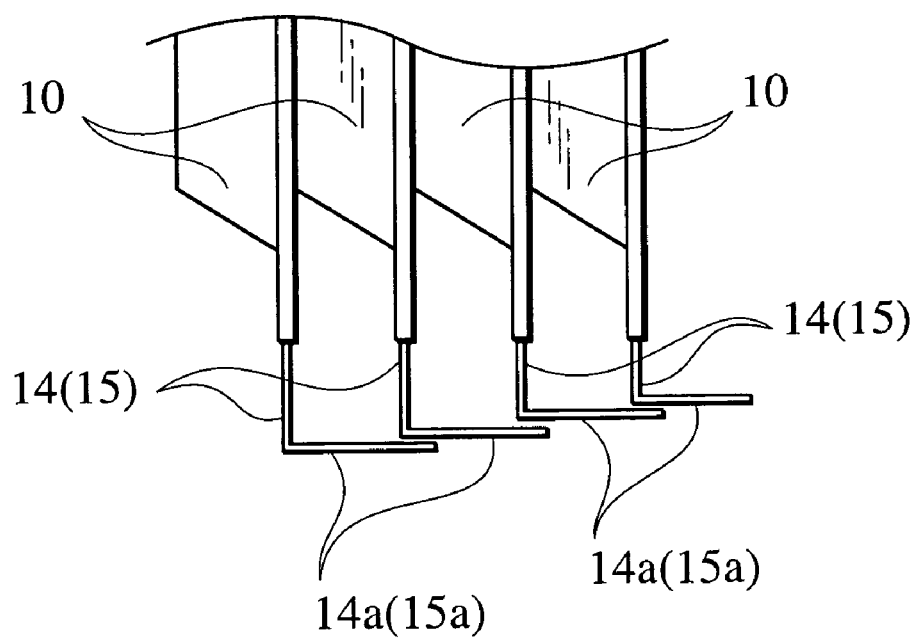
FIG. 16 is a view illustrating a modified form of the connecting structure of the cell of the embodiment according to the present invention.

Note that, although the embodiment described above is an example of using the cell holder 2 onto which the cell 10 is mounted and held, the present invention may adopt a structure in which a plurality of the cells 10 are directly stacked on one another at the multiple stages without utilizing the cell holders, as illustrated in FIG. 15 for example. Moreover, although the number of stacked (joined) pieces of the electrode tabs 14 and 15 of the cell 10 is two in any case of the electrode tabs 14 or 15 in the embodiment described above, it is needless to say that, as illustrated in FIG. 16 for example, the present invention may adopt a structure in which three or more pieces of the electrode tabs 14 and 15 are joined together.

The entire content of a Japanese Patent Application No. P2002-221999 with a filing date of Jul. 30, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A module battery, comprising:

a plurality of cells including an electrode tab and a cell body having a power generating element hermetically sealed in a package film, the power generating element being formed by stacking electrode plates, the electrode tab being connected to the power generating element and being drawn outward from an edge of the package film, wherein the module battery is configured such that the plurality of the cells are stacked on one another, and the electrode tabs of the cells adjacent to each other in a stacking direction are interconnected, wherein the electrode tabs of the cells form an approximate L-shape and the electrode tabs have a bent portion which is a portion extending from a folding line in the stacking direction of the cells, wherein the bent portions of the cells adjacent to each other in the stacking direction are at least partially overlapped with each other so as to be interconnected, and wherein the cells are mounted and held on respective frame-shaped cell holders, and the electrode tabs of the cells are exposed from between the cell holders adjacent to each other in the stacking direction.

2. The module battery of claim 1, wherein a slit is provided in the bent portion.

3. The module battery of claim 2, wherein the slit is provided in the overlapped bent portions of the electrode tabs but excluding a portion of the electrode tabs between the bent portion and the respective cell body.

4. The module battery of claim 1, wherein the cell holders are made of heat-resistant insulating resin.

5. The module battery of claim 1, wherein the cell holders have a locate pin, and the cells are provided with a through-bore penetrated by the locate pin of the cell holders.

6. The module battery of claim 5, wherein the locate pin of the cell holders is projected toward the stacking direction of the cell holders, and a locate hole which receives the locate pin of the cell holders is provided in a cell holders adjacent to other cell holders in the stacking direction.

* * * * *